United States Patent [19]
Yamashita et al.

[11] Patent Number: 4,726,645
[45] Date of Patent: Feb. 23, 1988

[54] OPTICAL COUPLER

[75] Inventors: Junichiro Yamashita; Yoshio Miyake; Toshio Takei, all of Kanagawa, Japan

[73] Assignee: Mitsubishi Denki Kabushiki Kaisha, Tokyo, Japan

[21] Appl. No.: 654,620

[22] Filed: Sep. 26, 1984

[30] Foreign Application Priority Data

Sep. 26, 1983 [JP] Japan .................. 58-148678[U]
Sep. 30, 1983 [JP] Japan .................. 58-182193

[51] Int. Cl.⁴ .................................. G02B 6/32
[52] U.S. Cl. ........................ 350/96.18; 350/96.15; 350/1.4
[58] Field of Search ......... 350/96.15, 96.18, 96.20, 350/1.4, 165, 438

[56] References Cited
U.S. PATENT DOCUMENTS

| 3,492,058 | 1/1970 | Waldman | 350/1.4 |
| 3,950,075 | 4/1976 | Cook et al. | 350/96.18 |
| 4,257,672 | 3/1981 | Balliet | 350/96.18 |
| 4,307,934 | 12/1981 | Palmer | 350/96.20 |
| 4,355,321 | 10/1982 | Yeats | 350/96.18 X |
| 4,436,363 | 3/1984 | Steinbruegge et al. | 350/1.6 |
| 4,475,788 | 10/1984 | Tomassini et al. | 350/96.20 |

OTHER PUBLICATIONS

Tackikawa et al., Yokosuka Electrical Communication Laboratory, *IOCC 4th International Conference*, 30C2-1, Jun. 6, 1983, "Design and Performance of Metal-Sealed, Laser Diode Coupler of Optical Subscriber Transmission".

Ackenhusen, *Applied Optics*, vol. 18, No. 21, 1 Nov. 1979, "Microlenses to Improve LED-to-Fiberoptical Coupling and Alignment Tolerance", pp. 3694–3699.

*Primary Examiner*—William L. Sikes
*Assistant Examiner*—Frank González
*Attorney, Agent, or Firm*—Sughrue, Mion, Zinn, Macpeak, and Seas

[57] ABSTRACT

In an optical coupling unit having an optical coupler adapted to couple a light beam from a light-emitting element to an optical fiber, the aberration of the lens is decreased to improve the efficiency of coupling of the light beam from the light-emitting element to the optical fiber. A silicon crystal having a high refractive index is used as a lens material to realize an optical system of low aberration.

10 Claims, 20 Drawing Figures

RADIUS OF CURVATURE
OF THE LENS R (mm)

OPTICAL COUPLER

BACKGROUND OF THE INVENTION

The present invention relates to an optical coupler for applying a near-infrared beam from a light-emitting element to an optical fiber with high efficiency in an optical transmitter used for optical fiber communications.

For data transmission using an optical fiber, in order to improve the transmission distance and the transmission characteristics of the fiber, it is essential to increase the amount of optical power in the optical fiber. Heretofore, a lens of optical glass has been used to transmit a light beam from a light-emitting element to an optical fiber. However, such a lens has a large aberration, and therefore the quantity of light entering the core of the optical fiber is considerably small.

FIG. 1 shows a laser-diode coupler of a type described in a paper by Y. Tachikawa et al. read at the IOOC 4th international Conference 30C2-1 (1983-6-30). In FIG. 1, reference numeral 1 designates an LD (laser diode); 2 a sapphire spherical lens; 3, an optical fiber; and 4, a cap which hermetically seals the LD 1 and holds the sapphire spherical lens 2.

FIG. 2 is a diagram for a description of a method of calculating the coupling efficiency of an optical coupler. In polar coordinates with the light-emitting center of the LD as the origin point, the angle of rotation around the optical axis is represented by $\psi$, and the angle with the optical axis by $\theta$. The light-emitting area of the LD is much smaller than the diameter of the lens 6 and the fiber 7, and therefore the LD can be approximated as a point light source. Thus, the coupling efficiency $\eta$ between the LD and the fiber is as follows:

$$\eta = \frac{\int_0^{2\pi} \int_0^{\pi/2} W(\theta,\psi) A_c(\theta,\psi) \sin\theta d\theta d\psi}{\int_0^{2\pi} \int_0^{\pi/2} W(\theta,\psi) \sin\theta d\theta d\psi}, \quad (1)$$

where $W(\theta,\psi)$ is the power density per unit solid angle extending in a direction $(\theta,\psi)$ from the LD, and $A_c(\theta,\psi)$ is the fraction of the light radiated in that direction coupled through the lens to the fiber. $A_c(\theta,\psi)$ can be obtained by a ray tracing method whereby the position and the direction of a light beam from the LD are obtained when the light beam enters the end face of the fiber, and these values are compared with the amount of light actually carried by the fiber.

If the distance between the incident point of the light beam to the fiber and the center of the fiber core is represented by $\gamma_{in}$, the radius of the core by $\gamma_c$, the incident angle to the fiber by $\theta_{local}$, then $A_c(\theta,\psi)$ can be represented as follows:

$$\gamma_{in} < \gamma_c \text{ and } \theta_{in} < \theta_{local} \quad (2)$$

$$A_c(\theta,\psi) = 1.0$$

$$\gamma_{in} \geq \gamma_c \text{ or } \theta_{in} \geq \theta_{local}$$

$$A_c(\theta,\psi) = 0.$$

In this connection, $\theta_{local}$ can be expressed by using the maximum light receiving angle $\theta_0$ at the core center as follows:

$$\theta_{local} = \begin{cases} \theta_0 \left[ 1 - \left(\frac{\gamma_{in}}{\gamma_c}\right)^2 \right]^{\frac{1}{2}} & (GI \text{ fiber}) \\ \theta_0 & (SI \text{ fiber}) \end{cases} \quad (3)$$

In general, in a rotationally symmetric single lens coupling system, the following effective angles $\theta_{eff}$ are inherent to combinations of coupling optical systems and optical fibers:

$$\theta \leq \theta_{eff} A_c(\theta,\psi) = 1$$

$$\theta > \theta_{eff} A_c(\theta,\psi) = 0 \quad (4)$$

Expression (1) above can be rewritten as the following expression (5) using expression (4):

$$\eta = \frac{\int_0^{2\pi} \int_0^{\theta_{eff}} W(\theta,\psi) \sin\theta d\theta d\psi}{\int_0^{2\pi} \int_0^{\pi/2} W(\theta,\psi) \sin\theta d\theta d\psi}. \quad (5)$$

Expression (4) indicates that only light energy radiated within the effective angle from the LD is coupled to the optical fiber. The angle $\theta_{eff}$ will be referred to as "an effective NA", when applicable. It goes without saying that the larger the effective NA of a coupling optical system coupled to a fiber, the larger the LD-to-fiber coupling efficiency.

With reference to the example shown in FIG. 1, the effective NA will be obtained using a known technique. In accordance with this technique, the diameter of the spherical lens is 2 mm, the refractive index is about 1.76 (for sapphire), and the core diameter of the optical fiber is 40 $\mu$m. FIGS. 3 and 4 are diagrams provided for a description of the incidence of a light beam from the LD to the optical fiber with the coupling system arranged most suitably. More specifically, FIG. 3 is a ray tracing diagram showing a light beam from the LD at the coordinate origin point (0,0) which is refracted by a sapphire spherical lens 8 and is applied to the fiber, and FIG. 4 shows an aberration curve. In FIG. 4, with the radiation angle $\theta$ of a light beam emitted by the LD plotted on the y-coordinate axis and the distance $\gamma_{in}$ between the incident point of the light beam on the end face of the fiber and the optical axis on the x-coordinate axis, the relation between the $\theta$ and $\gamma_{in}$ of the light beam is indicated. In the case of a light beam coupled to a fiber having a core diameter of 40 $\mu$m, $\gamma_{in} \leq 20$ $\mu$m should be established. As is apparent from FIG. 4, light beams satisfying this requirement are such that $\theta \leq 16.1°$. Expression (2) indicates that factors determining the effective angle $\theta_{eff}$ reside in both the position of the incident point and the incident angle of the light beam applied to the fiber. Both must satisfy conditions of incidence to the fiber. FIG. 4 illustrates only the condition as to the position of the incident point. In general, in an optical system in which the distance between the lens and the fiber is several times the distance between the LD and the lens, that is, in an optical system having a large magnification factor, the effective angle $\theta_{eff}$ can be determined only by the condition of the position of the incident point. Accordingly, in the coupling system of the known technique illustrated in FIG.

1, the effective angle $\theta_{eff}$ is 16.1°, and of those rays from the LD, only the rays emitted within the effective angle of 16.1° are coupled to the optical fiber. In such a coupling system, the light beam from the LD is not always effectively coupled to the fiber.

SUMMARY OF THE INVENTION

To improve the coupling between the LD and the fiber, the invention provides an optical coupler adapted to apply a near infrared beam from a light-emitting element through an optical system to an optical fiber, in which a spherical lens formed by a polished silicon crystal is employed as the optical system.

Further, the invention provides an optical coupler in which a spherical lens is hermetically secured to a cap, thereby increasing the service life of the light-emitting element.

The foregoing as well as other characteristic features of the invention will become more apparent from the following detailed description and the appended claims when read in conjunction with the accompanying drawings.

DESCRIPTION OF THE PREFERRED EMBODIMENTS

Figure 1:
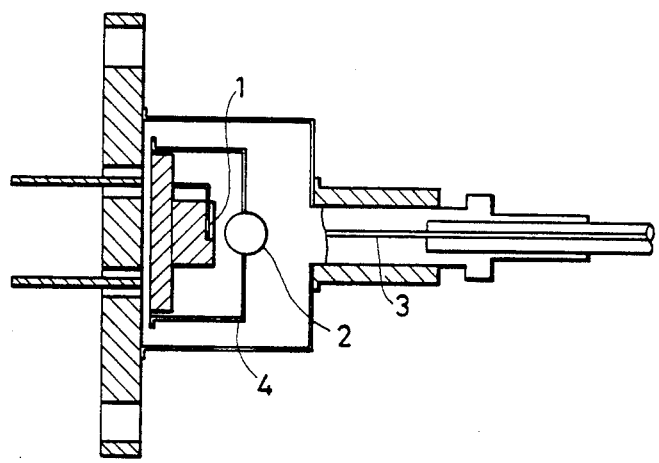
FIG. 1 is an explanatory diagram showing the arrangement of a conventional LD coupler.
Figure 2:
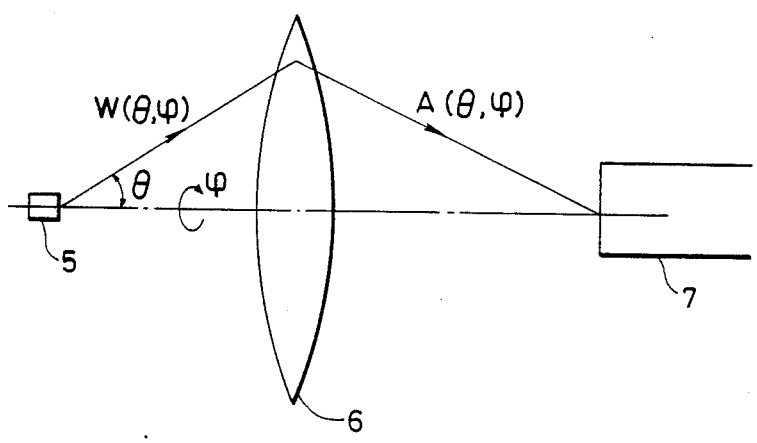
FIG. 2 is an explanatory diagram used for a description of a method of calculating the coupling efficiency of an optical coupler.
Figure 3:
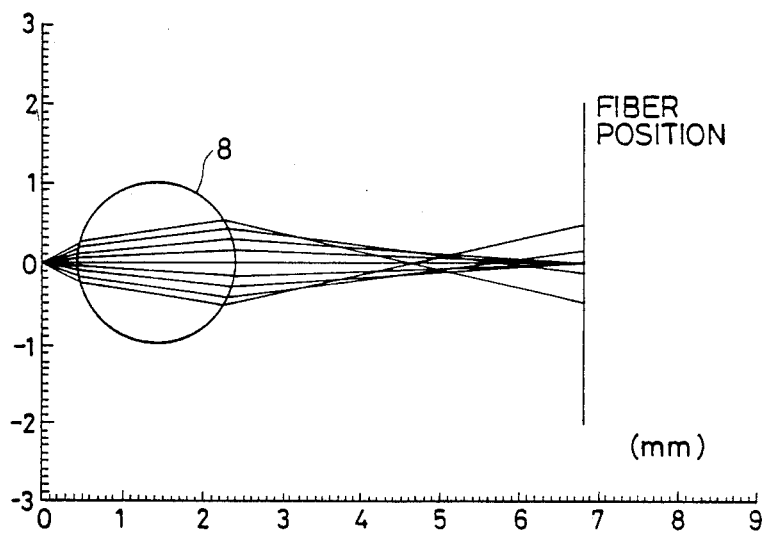
FIGS. 3 and 4 are diagrams showing a light beam which is emitted by a laser diode and applied to an optical fiber in a conventional optical coupler.
Figure 4:
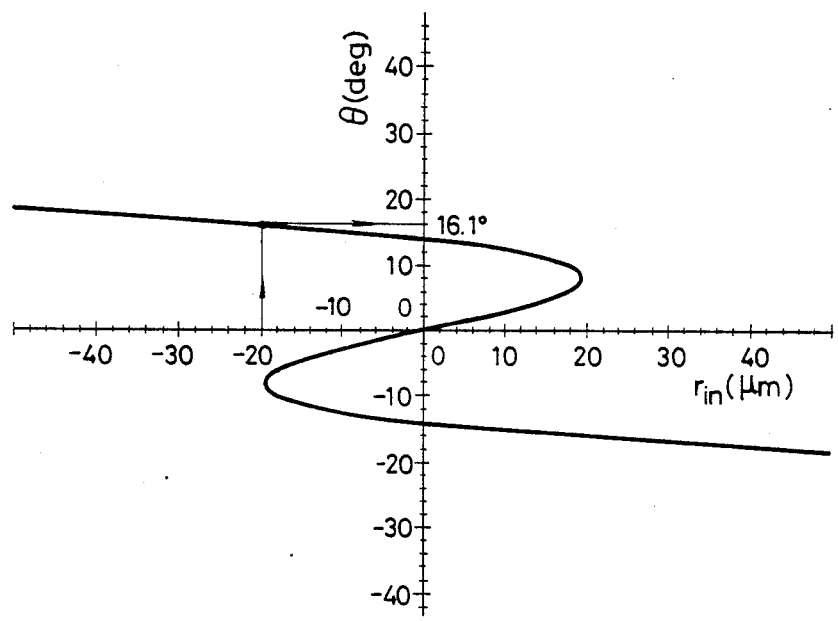
Figure 5:
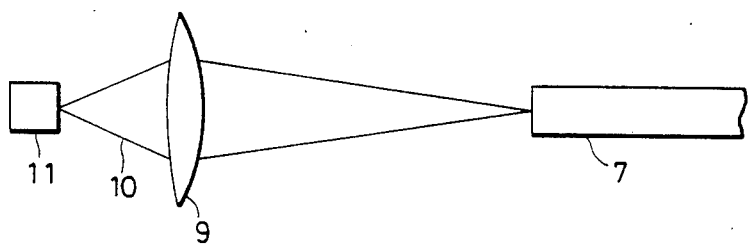
FIG. 5 is an explanatory diagram showing an optical coupler unit constructed in accordance with a first embodiment of the invention.

FIG. 5 is a diagram showing a first embodiment of an optical coupler of the invention. A near-infrared beam 10 emitted by an LD 11 is refracted by a spherical lens 9 and applied to a fiber 7. The spherical lens 9 is formed by subjecting both sides of a silicon crystal to spherical polishing. A silicon crystal does not transmit visible light, but transmits near infrared rays of 1.2 to 13 μm in wavelength. In the transmission region, the refractive index is 3.5, which is much larger than the refractive index 1.4 to 2.0 of ordinary optical glass.

One of the available methods of increasing the coupling efficiency is to decrease the focal length of the coupling optical system to thereby decrease the amount of aberration. However, this method involves difficulties in that the optimum distance between the LD and the lens is so short that the quantity of light returned to the LD is increased, and also the manufacturing tolerances are considerably severe. In order to reduce the amount of aberration with the focal length maintained long, a material of high refractive index can be used so that a large refractive power is obtained even with a large radius of curvature.

The coupling optical system of the invention employs the latter technique. Accordingly, the coupling efficiency of the optical system is high, the manufacturing tolerances are not so severe, and the quantity of light returned to the LD is small.

Figure 6:
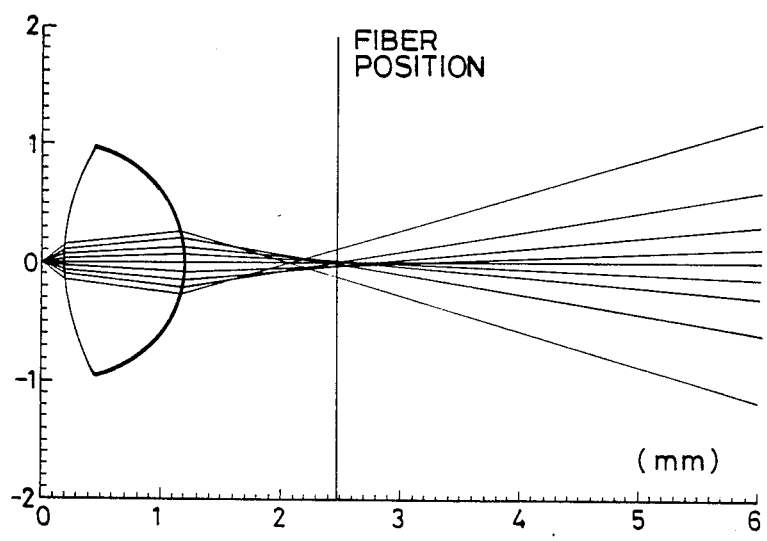
FIGS. 6 and 7 are diagrams showing characteristics of a specific example of an optical coupler unit of the first embodiment of the invention.

FIG. 6 is a ray tracing diagram for a specific example of an optical coupler unit of a first embodiment of the invention. In this example, the LD was at the coordinate origin (0,0), the lens surface distance was 1 mm, the radius of curvature of the curved surface of the lens on the side of the LD was 2 mm, and the radius of curvature of the curved surface of the lens on the side of the fiber was 1 mm. In order to maximize the effective angle $\theta_{eff}$ with a fiber having a core diameter of 40 μm, the distance between the LD and the lens was set to 180 μm and the distance between the lens and the fiber to 1.3 mm.

Figure 7:
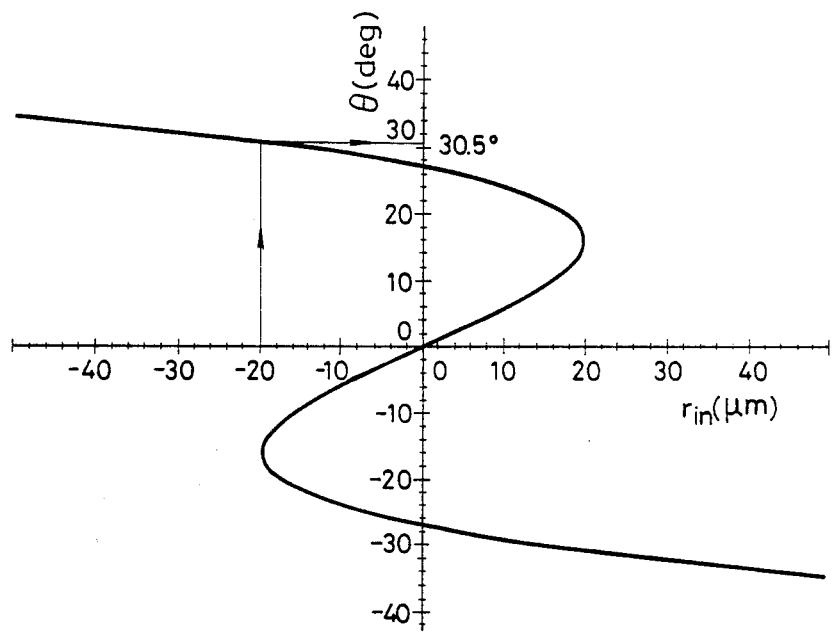

FIG. 7 is a diagram showing an aberration curve for the case of FIG. 6. For this aberration curve, the radiation angle $\theta$ of a light beam from the LD is plotted on the y-coordinate axis and the distance $\gamma_{in}$ between the incident point of the light beam on the end face of the fiber and the optical axis is plotted on the x-coordinate axis. It is apparent from this figure that a light beam coupled to a fiber having a 40 μm core diameter will satisfy $\theta \leq 30.5°$. As was described above, in a coupling system employing a large magnification, the condition as to the incident angle of the light beam to the fiber is not dominant, and therefore this angle is the effective angle $\theta_{eff}$. That is, in the case of FIG. 6, of the rays from the LD, those rays emitted within an angle up to 30.5 degrees are coupled to the fiber. Thus, this embodiment realizes an optical coupler unit having a high coupling efficiency.

Figure 8:
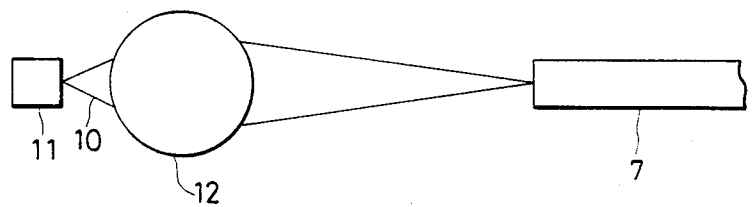
FIG. 8 is an explanatory diagram showing an optical coupler unit constructed in accordance with a second embodiment of the invention.

FIG. 8 is a diagram illustrating a second embodiment of the invention. A near infrared beam 10 from an LD 11 is refracted by a spherical lens 12, which is formed by polishing a silicon crystal, and is applied to a fiber 7. Formation of a lens of small size and small radius of curvature, such as the one described with reference to the example of the optical coupler of the first embodiment of the invention, requires a large number of manufacturing steps. On the other hand, spherical products, similar to the case of ball bearing balls, can be readily manufactured with high accuracy and at a low cost. Therefore, an optical coupler using a spherical lens is advantageous in that the manufacturing cost is low while the lens accuracy is high.

Figure 9:
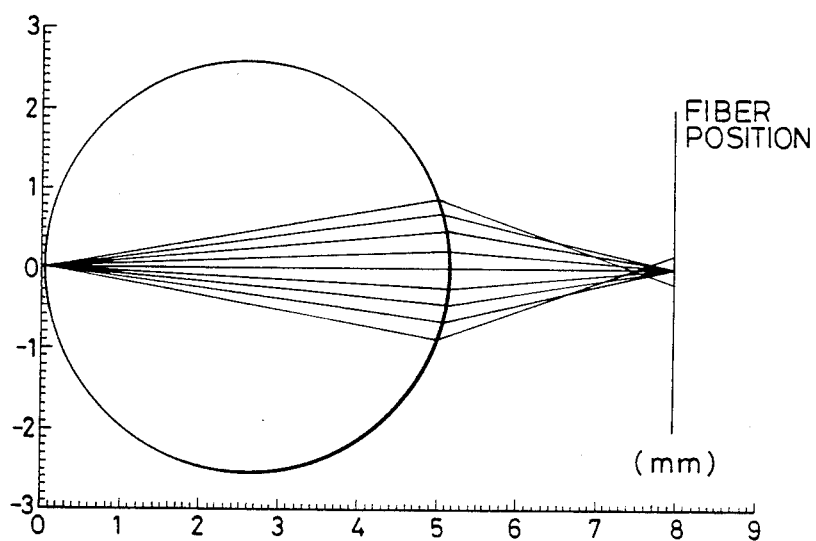
FIGS. 9 and 10 are diagrams showing characteristics of a specific example of an optical coupler unit of the second embodiment of the invention.

FIG. 9 is a ray tracing diagram for a specific example of an optical coupler unit of the second embodiment of the invention. Here, the LD was positioned at the coordinate origin (0,0) in the figure. The lens diameter was 5 mm. In order to maximize the effective angle $\theta_{eff}$ with a fiber having a core diameter of 40 $\mu$m, the distance between the LD and the lens was set to 23 $\mu$m, and the distance between the lens and the fiber to 2.92 mm.

Figure 10:
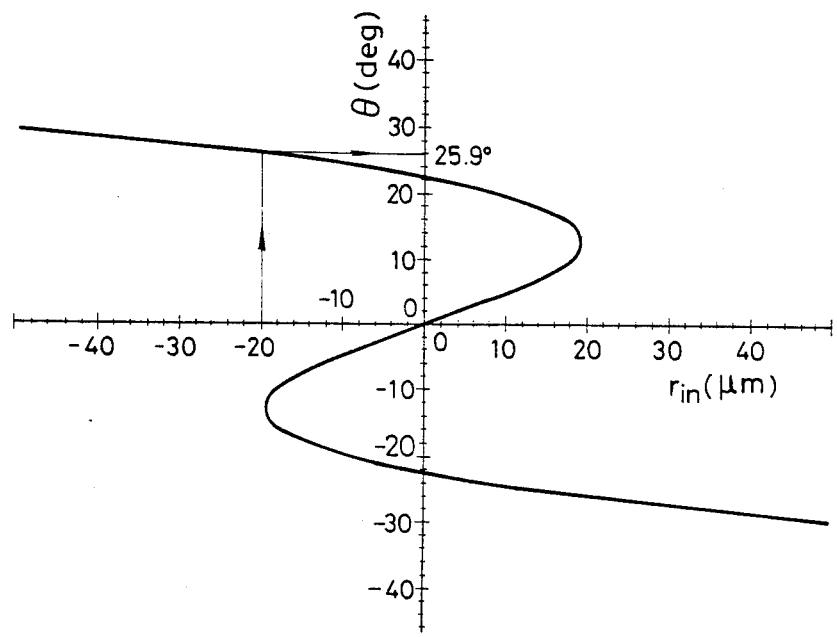

FIG. 10 is a diagram showing an aberration curve for the case of FIG. 9. For this aberration curve, the radiation angle $\theta$ of a light beam from the LD is plotted on the y-coordinate axis and the distance $\gamma_{in}$ between the incident point of the light beam on the end face of the fiber and the optical axis is plotted on the x-coordinate axis. As is apparent from FIG. 10, those light beams which will be coupled to a fiber having a 40 $\mu$m core diameter satisfy $\theta \leq 25.9°$. As described above, in a coupling system having large magnification, the condition as to the incident angle of the light beam to the fiber is not dominant, and therefore this angle is the effective angle $\theta_{eff}$. That is, in the case of FIG. 9, of the rays from the LD, rays within an angle of 25.9° are coupled to the fiber. Thus, this embodiment realize an optical coupler unit having a high coupling efficiency.

Figure 11:
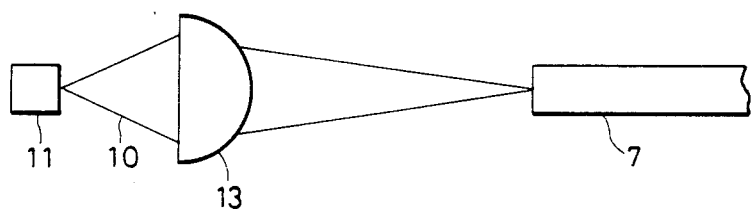
FIG. 11 is an explanatory diagram showing an optical coupler unit of a third embodiment of the invention.

FIG. 11 is a diagram depicting a third embodiment of the invention. A near-infrared beam 10 from an LD is refracted by a semispherical lens 13, which is formed by polishing a silicon crystal, and is applied to a fiber 7. In the case where a silicon crystal spherical lens is used in an optical coupler, in general, the focal length is short compared with the diameter of the lens because the refractive index of silicon is large. This is apparent from the example of the optical coupler unit of the second embodiment of the invention in which, although the diameter of the lens is 5 mm, the distance between the LD and the lens is only 23 $\mu$m. The short distance between the LD and the lens may result in difficulties in that the operation of the LD is made unstable by the presence of light beams returned (reflected) to the LD from the surface of the lens, and in that it is difficult to assemble the coupling optical system. In the case where a silicon crystal spherical lens is employed, in order to increase the distance between the LD and the lens, it is necessary to make the diameter of the lens extremely large, which may obstruct the arrangement of the coupling optical system. In the embodiment shown in FIG. 11, because a semispherical lens having a flat side disposed facing the LD is used, the refractive power of the lens is decreased on the side of the LD, whereby a long focal length is obtained with a small lens.

Figure 12:
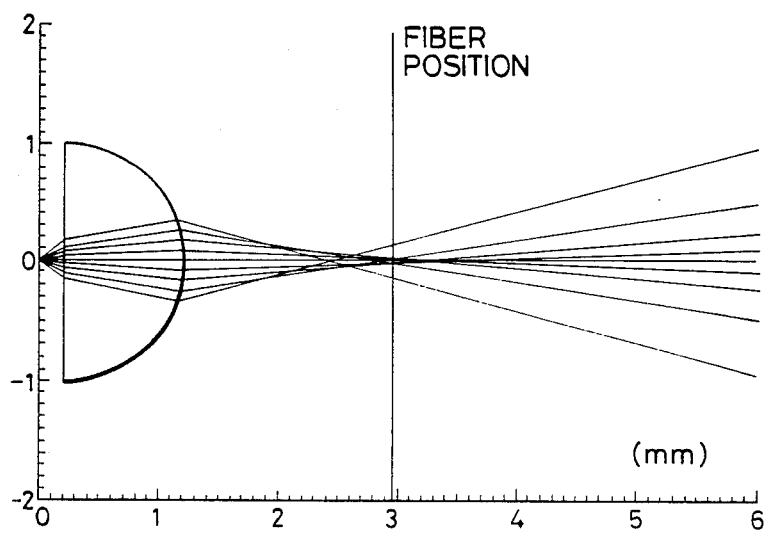
FIGS. 12 and 13 are diagrams showing characteristics of a specific example of an optical coupler unit constructed in accordance with the third embodiment of the invention.

FIG. 12 is a ray tracing diagram for a specific example of an optical coupler unit of the third embodiment of the invention. The LD was positioned at the coordinate origin (0,0) in the figure. The lens diameter was 2 mm. In order to maximize the effective angle $\theta_{eff}$ with a fiber having a core diameter of 40 $\mu$m, the distance between the LD and the lens was set to 200 $\mu$m and the distance between the lens and the fiber was set to 1.76 mm.

Figure 13:
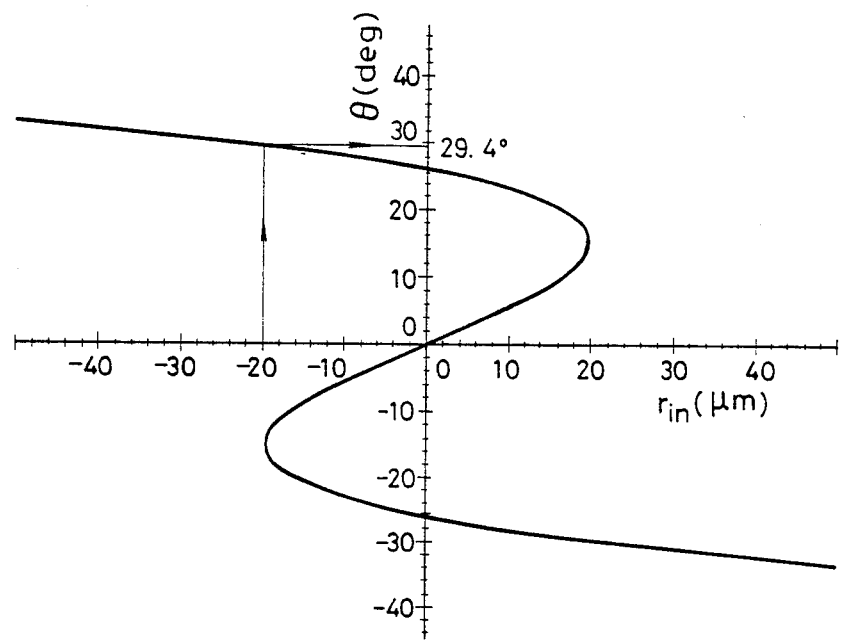

FIG. 13 is a diagram showing an aberration curve for the case of FIG. 12. For this aberration curve, the radiation angle $\theta$ of a light beam from the LD is plotted on the y-coordinate axis and the distance $\gamma_{in}$ between the incident point of the light beam of the end face of the fiber and the optical axis is plotted on the x-coordinate axis. As is apparent from FIG. 13, the light beam coupled to the fiber having a core diameter of 40 $\mu$m satisfies 29.4°. As described above, the condition as to the incident angle of the light beam to the fiber is not dominant, and therefore this angle is the effective angle $\theta_{eff}$. That is, in the case of FIG. 9, of the rays emitted from the LD, those rays within an angle of 29.4° are coupled to the fiber. Thus, this design can realize an optical coupler having a high coupling efficiency.

The coupling characteristic will now be considered for the case where the flat surface of a semispherical lens faces towards the fiber.

Figure 14:
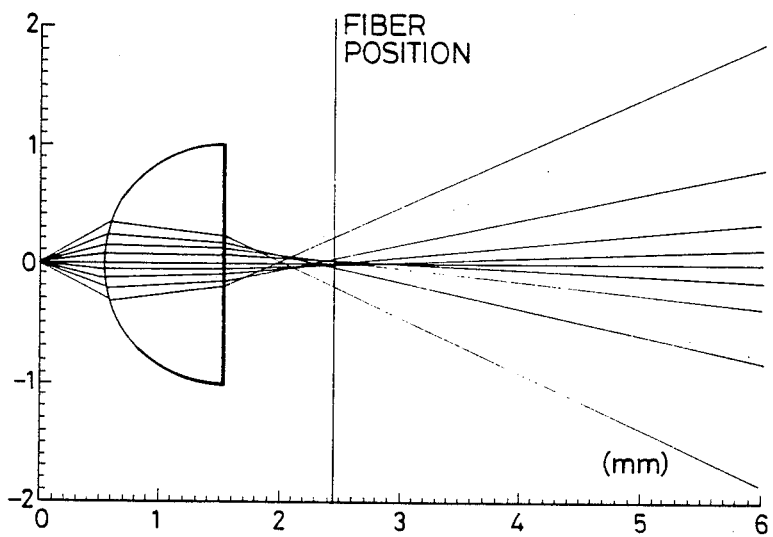
FIGS. 14 and 15 are diagrams showing characteristics of a silicon crystal semispherical lens coupling system, a flat surface of which faces the fiber.

FIG. 14 is a ray tracing diagram for the case where the flat surface of the semispherical lens in FIG. 12 faces the fiber and where the distance between the LD and the lens and the distance between the lens and the fiber are adjusted to most suitable values. The LD is positioned at the coordinate origin (0,0) in the figure. The lens diameter was 2 mm. In order to maximize the effective angle $\theta_{eff}$ with a fiber having a core diameter of 40 $\mu$m, the distance between the LD and the lens was set to 520 $\mu$m, and the distance between the lens and the fiber was set to 940 $\mu$m.

Figure 15:
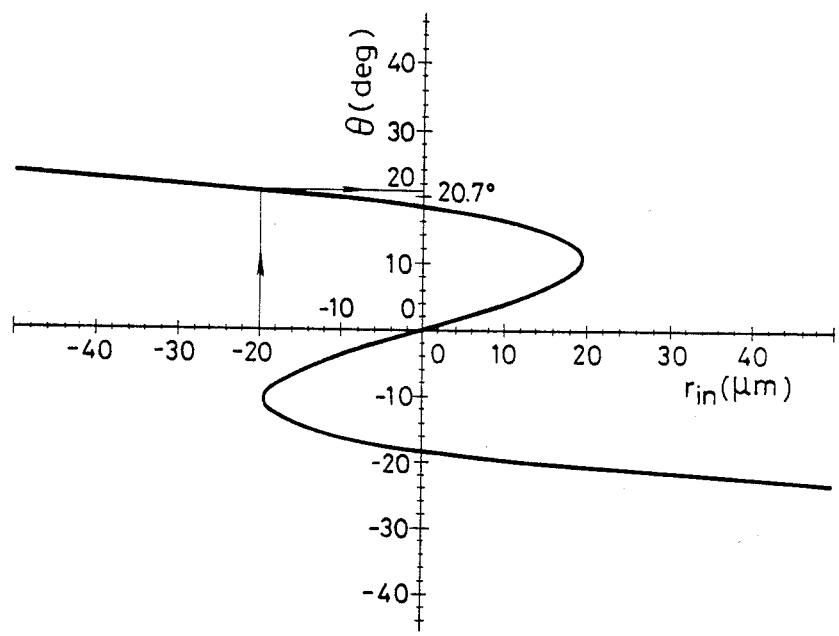

FIG. 15 is a diagram showing an aberration curve for the case of FIG. 14. The aberration curve is formed with the radiation angle $\theta$ of a light beam from the LD plotted on the y-coordinate axis and the distance $\gamma_{in}$ between the incident point of the light beam on the end face of the fiber plotted on the x-coordinate axis. As is apparent from FIG. 15, those light beams coupled to a fiber having a 40 $\mu$m core diameter satisfy $\theta \leq 20.7°$. Accordingly, in the case where the flat surface of the semispherical lens faces towards the fiber, the amount of aberration is increased and the effective angle $\theta_{eff}$ is decreased compared with the values obtained where the flat surface faces towards the LD. This tendency exists not only for the cases of FIGS. 12 and 14, but also in a coupling system in which the distance between the lens and the fiber is longer than that between the LD and lens.

Figure 16:
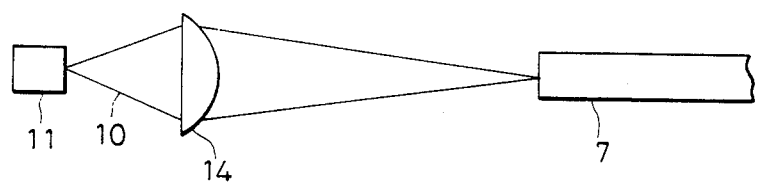
FIG. 16 is an explanatory diagram showing an optical coupler unit constructed in accordance with a fourth embodiment of the invention.

FIG. 16 is a diagram illustrating a fourth embodiment of the invention. In FIG. 16, reference numeral 14 designates a plano-convex lens which is formed by polishing a silicon crystal in such a manner that the lens has a flat surface on one side and a spherical surface on the other side. A near-infrared beam 10 from an LD 11 is refracted by the plano-convex lens 14 and applied to a fiber 7. In the third embodiment, the lens is obtained by polishing a spherical lens to provide a plane which passes through the center of the spherical lens, while in the fourth embodiment, the plane is shifted from the center as shown in FIG. 14. As in the case of a semispherical lens, plano-convex lenses of low manufacturing cost and high accuracy are readily available.

FIG. 7 shows the optimum distance $d_1$ between the LD and the lens, and the effective angle $\theta_{eff}$ in the case where, in the fourth embodiment, the radius of curvature of the lens is changed with the distance between the surfaces of the lens maintained constant (1 mm).

Figure 18:
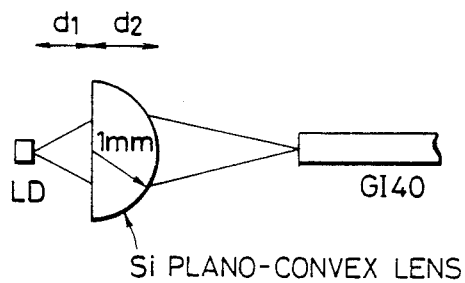
Figure 18:
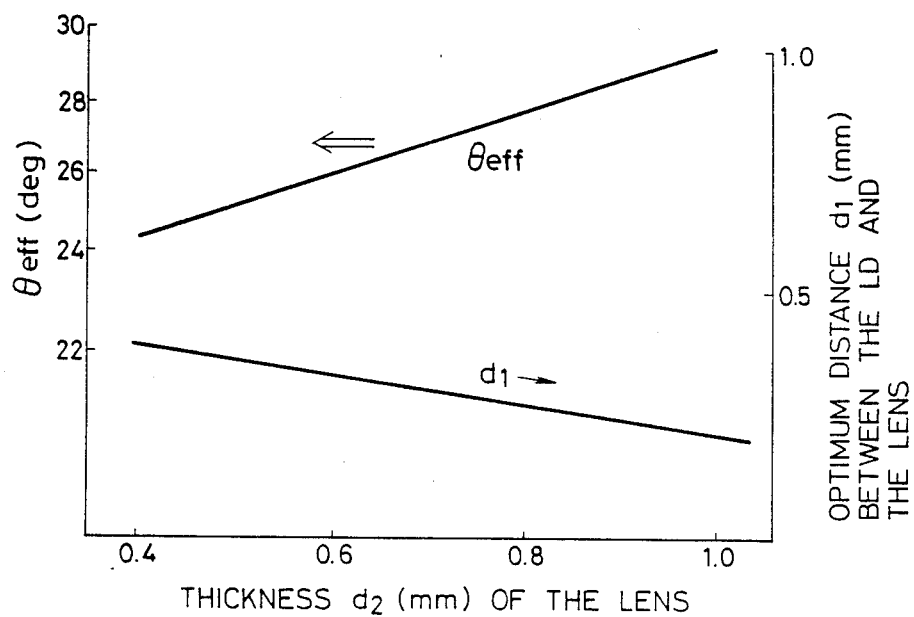

FIG. 18 shows the optimum distance $d_1$ between the LD and the lens, and the effective angle $\theta_{eff}$ in the case where, in the fourth embodiment, the thickness $d_2$ of the lens is changed with the radius of curvature of the lens maintained unchanged (1 mm).

Figure 17:
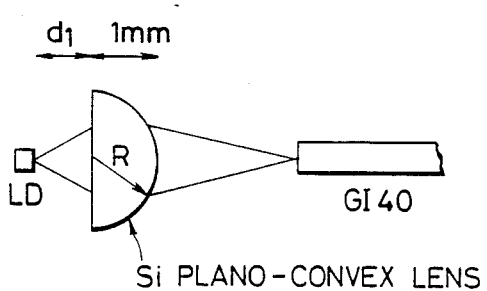
FIGS. 17 and 18 are diagrams showing characteristics of a specific example of the optical coupler unit of FIG. 16.
Figure 17:
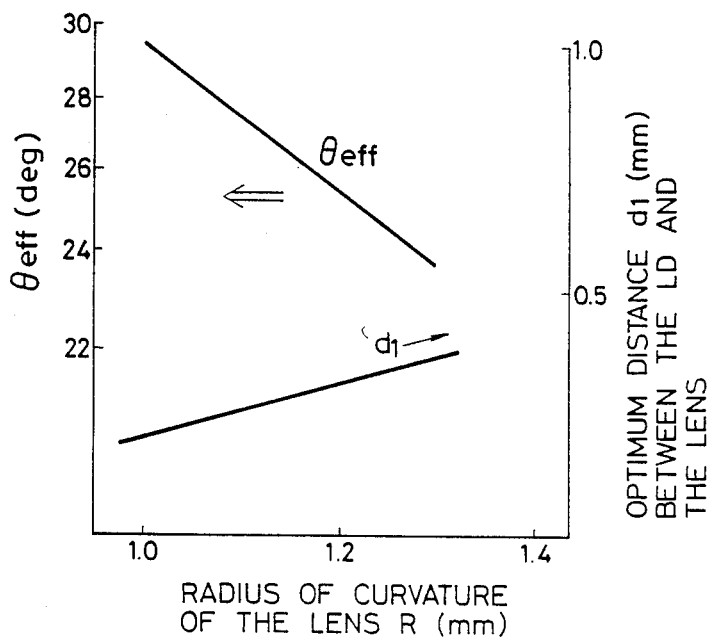

As is apparent from FIGS. 17 and 18, the distance between the LD and the lens can be increased by decreasing the thickness of the lens or by increasing the radius of curvature of the lens. However, in this case, the effective angle $\theta_{eff}$ is decreased. Accordingly, the thickness and the radius of curvature of the lens should be determined by taking into consideration the allowable quantity of light returned to the LD, the manufacturing tolerances of the coupling optical system, and the required coupling efficiency.

Figure 19:
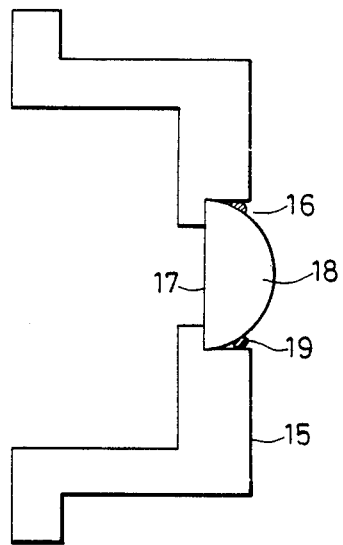
FIG. 19 is an explanatory diagram showing an optical coupler constructed in accordance with a fifth embodiment of the invention.

FIG. 19 is a diagram showing a fifth embodiment of the invention, in which a silicon crystal semispherical lens is employed. As shown in FIG. 19, an output hole 17 including a counter bore 16 is formed in a casing 15 at the center. The silicon crystal semispherical lens 18 is mounted in the counter bore 16 in such a manner that its flat surface is on the bottom of the counter bore 16. The periphery of the lens is hermetically secured to the wall of the counter bore 16 with a brazing material, low-melting-point glass or adhesive 19.

Figure 20:
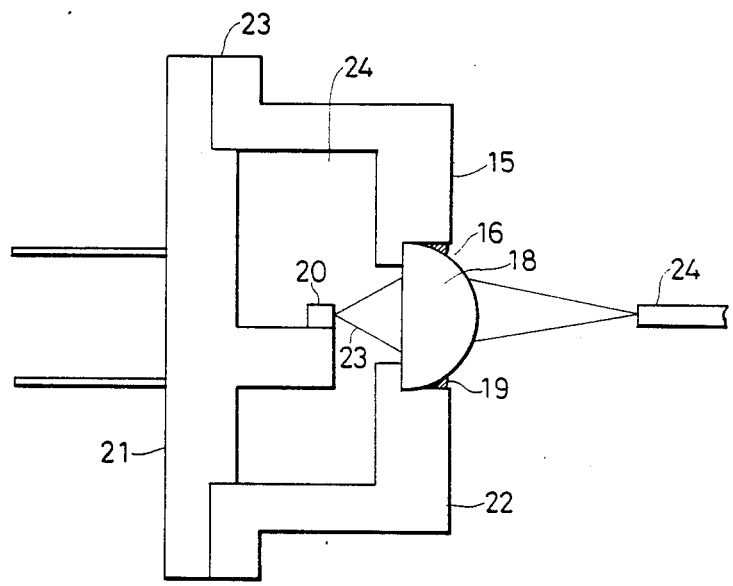
FIG. 20 is an explanatory diagram showing a light-emitting element which is hermetically sealed with the optical coupler shown in FIG. 19.

FIG. 20 shows a hermetically sealed light-emitting element 20 constructed in accordance with the fifth embodiment of the invention. A header 21 carrying the light-emitting element 20 is welded to a cap 22. A chamber 24 formed by the cap 22 and the header 21 is filled with nitrogen gas. The junction of the cap and the header and the region where the periphery of the lens is secured to the wall of the counter bore with the brazing material, low-melting-point glass or adhesive are maintained gas tight. By maintaining nitrogen gas in the chamber 24, the service life of the light-emitting element 20 is prolonged.

One of the important factors which govern the coupling efficiency of the light-emitting element and the fiber is the relative position of the light-emitting element and the silicon crystal semispherical lens 18. In the optical coupler according to the invention, by controlling the position, inside diameter and depth of the coupler bore 16, the relative position of the light-emitting element and the lens can be maintained with high accuracy because the flat surface of the semispherical lens 16 is in contact with the flat surface of the counter bore. The light-emitting element can be mounted on the header 21 with extremely high accuracy (within a tolerance of 10 μm using a special tool). Furthermore, as the header 21 can be press fitted in the casing 15, the relative position of the light-emitting element 20 and the casing can be maintained with high precision.

Available machining techniques allow formation of the counter bore 16 within a tolerance of several microns. Therefore, the error of the relative position of the light-emitting element 20 and the semispherical lens 18 can be within the required tolerance (typically of the order of ±20 μm). Therefore, when a light beam 23 from the light-emitting element 20 is coupled to the optical fiber 24, a high coupling efficiency which is stably maintained is obtained.

As is apparent from the above description, with the optical coupler according to the invention, a light beam from the light-emitting element is stably applied to the optical fiber with a high coupling efficiency.

In the above-described embodiment, a silicon crystal semispherical lens is employed. However, it goes without saying that the same effect can be obtained by using a silicon crystal plano-convex lens.

In the above-described embodiments, surface reflections of the lens are not specifically mentioned. However, it goes without saying that, in the case where a lens having a high refractive index is employed, in order to prevent Fresnel reflections, it is necessary to provide an antireflective coating on the surface of the lens.

What is claimed is:

1. In an optical coupler unit having an optical coupler disposed between a light-emitting element and an optical fiber for coupling a light beam emitted by said light-emitting element to said optical fiber, the improvement wherein said optical coupler comprises a silicon crystal spherical lens, the surfaces of which are covered with an antireflective coating.

2. The optical coupler unit as claimed in claim 1, in which said silicon crystal spherical lens is a silicon crystal lens having the form of a sphere.

3. The optical coupler unit as claimed in claim 1, in which said silicon crystal spherical lens is a silicon crystal plano-convex lens.

4. The optical coupler unit as claimed in claim 1, in which said silicon crystal spherical lens is a silicon crystal semispherical lens.

5. The optical coupler unit as claimed in claim 3, in which said silicon crystal plano-convex lens is disposed in such a manner that a flat surface thereof faces toward said light-emitting element.

6. The optical coupler unit as claimed in claim 3, in which said silicon crystal plano-convex lens is disposed in such a manner that a flat surface thereof faces toward said optical fiber.

7. The optical coupler unit as claimed in claim 4, wherein said lens is disposed in such a manner that a flat surface thereof faces toward said optical fiber.

8. The optical coupler unit as claimed in claim 4, wherein said lens is disposed in such a manner that a flat surface thereof faces toward said light-emitting element.

9. An optical coupler unit comprising: an optical coupler disposed between a light-emitting element and an optical fiber to couple a light beam emitted by said light-emitting element to said optical fiber; a mount which fixedly secures said optical coupler, said mount having a through hole at a center thereof, said through hole having a counter bore formed therein; and one of a silicon crystal semi-spherical lens and a silicon crystal plano-convex lens mounted in said counter bore in such a manner that a flat surface of said lens rests on a bottom of said counter bore and a periphery of said lens is hermetically secured to an inner wall of said counter bore.

10. The optical coupler unit as claimed in claim 9, in which the periphery of said lens is hermetically secured to said inner wall of said counter bore with a material selected from the group consisting of brazing material, adhesive and low-melting-point glass.

* * * * *